United States Patent
Craig et al.

[19]

[11] Patent Number: 6,066,981

[45] Date of Patent: May 23, 2000

[54] METHOD AND APPARATUS FOR AUTOMATICALLY SELECTING CLOCK VOLTAGE LEVELS

[75] Inventors: Dennis Craig, Sherwood; Todd Erdner, Beaverton, both of Oreg.

[73] Assignee: Intel Corporation, Sana Clara, Calif.

[21] Appl. No.: 09/002,569

[22] Filed: Dec. 31, 1997

[51] Int. Cl.⁷ .................................................. H01L 25/00

[52] U.S. Cl. ............................................ 327/565; 327/566

[58] Field of Search ................................. 327/565, 566; 361/785, 786, 790, 792

[56] References Cited

U.S. PATENT DOCUMENTS

| | | | |
|---|---|---|---|
| 4,674,007 | 6/1987 | Tragen | 361/404 |
| 5,277,595 | 1/1994 | Clark | 439/75 |
| 5,604,888 | 2/1997 | Kiani-Shabestari et al. | 395/500 |

*Primary Examiner*—Kenneth B. Wells
*Attorney, Agent, or Firm*—Blakely, Sokoloff, Taylor & Zafman LLP

[57] ABSTRACT

A motherboard/daughterboard assembly is configured to permit upgrading of a system to a microprocessor requiring different clock signals. The motherboard includes a clock generator mounted on the motherboard with a control input terminal and an output terminal. The clock generator delivers a first and second clock signal on the output terminal in response to receiving a first and second signal on the control input terminal, respectively. A first electrical connector is mounted on the motherboard and has a first terminal. The first terminal is coupled to the control input terminal of the clock generator. The daughterboard has a second electrical connector mounted thereon, and a first terminal. The second electrical connector is mateable with the first electrical connector to electrically engage the first terminals of the first and second electrical connectors. The first terminal of the second electrical connector is adapted to be connected to one of a first and second voltage supply to generate one of the first and second signals on the control input terminal of the clock generator in response to the first and second electrical connectors being mated together.

12 Claims, 2 Drawing Sheets

METHOD AND APPARATUS FOR AUTOMATICALLY SELECTING CLOCK VOLTAGE LEVELS

BACKGROUND OF THE INVENTION

1. Field of the Invention

This invention relates generally to interfacing electrical components, and, more particularly, to a method and apparatus for automatically selecting an appropriate voltage level for an interface signal.

2. Description of the Related Art

The field of electronics in general, and personal computers in particular, is evolving at a very fast pace. As semiconductor devices have become smaller and more densely populated, voltage and power requirements have fallen dramatically. For example, the operating voltage of some semiconductor devices, such as microprocessors, has recently fallen from about 3.3V to about 2.5V. Semiconductor devices that interface with and support microprocessors have historically been designed to operate at similar voltages, or at least be designed to receive and deliver signals at these voltages. Typically, these supporting semiconductor devices are located on a motherboard along with the microprocessor. To facilitate upgrades, the motherboard has been designed with sockets that allow for the removal and replacement of the microprocessor, as faster and more powerful microprocessors become available. However, where the next generation of microprocessor uses a substantially reduced operating voltage, then the motherboard and/or supporting semiconductor devices may not operate properly, impeding the ability to upgrade.

This impedance to upgrading is problematic for at least three reasons. First, consumers may be reluctant to purchase personal computers that cannot be readily upgraded as better technology becomes available. Second, manufactures of supporting semiconductor devices may be forced to redesign with each new microprocessor. Third, manufacturers of personal computers may be forced to substantially redesign their motherboards each time a new microprocessor is introduced. This significant redesign effort is inefficient and costly.

Alternatively, motherboard manufacturers may be able to design in some flexibility through the use of manually selectable jumpers. Manually selectable jumpers are problematic in that they leave open the possibility that improper installation will occur at the time that the upgrade is attempted. Mislocated jumpers will, at best, cause poor performance or inoperability, and may even damage the personal computer.

The present invention is directed to overcoming, or at least reducing the effects of, one or more of the problems set forth above.

SUMMARY OF THE INVENTION

In one aspect of the present invention, an apparatus includes a motherboard and a daughterboard. The motherboard includes a clock generator mounted on the motherboard with a control input terminal and an output terminal. The clock generator delivers a first and second clock signal on the output terminal in response to receiving a first and second signal on the control input terminal, respectively. A first electrical connector is mounted on the motherboard and has a first terminal. The first terminal is coupled to the control input terminal of the clock generator. The daughterboard has a second electrical connector mounted thereon, and a first terminal. The second electrical connector is mateable with the first electrical connector to electrically engage the first terminals of the first and second electrical connectors. The first terminal of the second electrical connector is adapted to be connected to one of a first and second voltage supply to generate one of the first and second signals on the control input terminal of the clock generator in response to the first and second electrical connectors being mated together.

In another aspect of the instant invention, a method is provided for controlling a clock generator on a motherboard to deliver one of a first and second clock signals to a daughterboard. The clock generator has a control input and an output coupled to a first and second terminal, respectively, of a first electrical connector on the motherboard. The method includes coupling a first voltage supply terminal to a corresponding first terminal of a second electrical connector on the daughterboard in response to a first type of circuit being located on the daughterboard. Alternatively, a second voltage supply terminal is coupled to the first terminal of the second electrical connector on the daughterboard in response to a second type of circuit being located on the daughterboard. A clock input terminal of a circuit mounted on the daughterboard is coupled to the second terminal of the second electrical connector.

BRIEF DESCRIPTION OF THE DRAWINGS

Other objects and advantages of the invention will become apparent upon reading the following detailed description and upon reference to the drawings in which.

Figure 1:
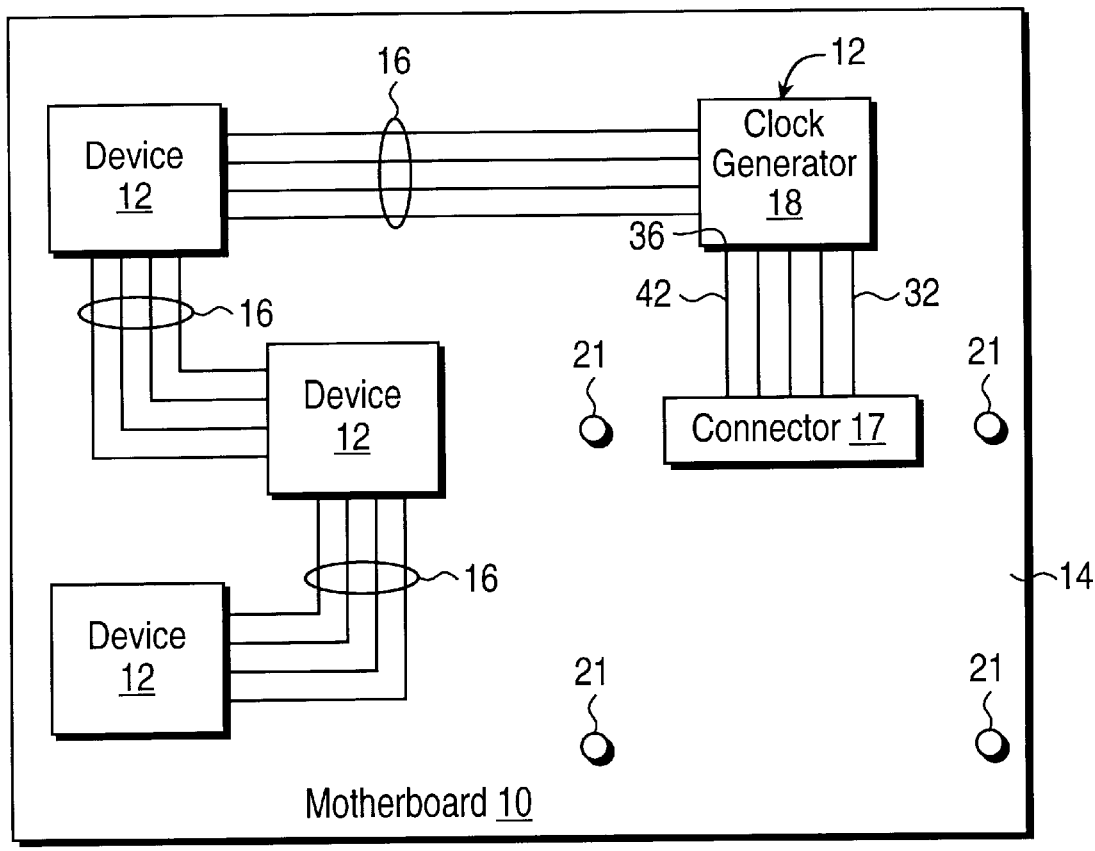
FIG. 1 illustrates a diagrammatic view of a motherboard adapted to receive a daughter-board according to one aspect of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and in particular to FIG. 1, a printed circuit board, such as a motherboard 10, is shown with a variety of semiconductor devices 12 deployed on its surface 14. The semiconductor devices 12 are electrically coupled together by a plurality of conductive traces 16. A conventional electrical connector 17 is also deployed on the surface 14 of the motherboard 10, and is electrically coupled to at least one of the semiconductor devices 12, such as a clock generator 18. In one embodiment of the instant invention, the clock generator 18 is a mixed voltage clock synthesizer manufactured by Intel as part number CKDM66.

Figure 2:
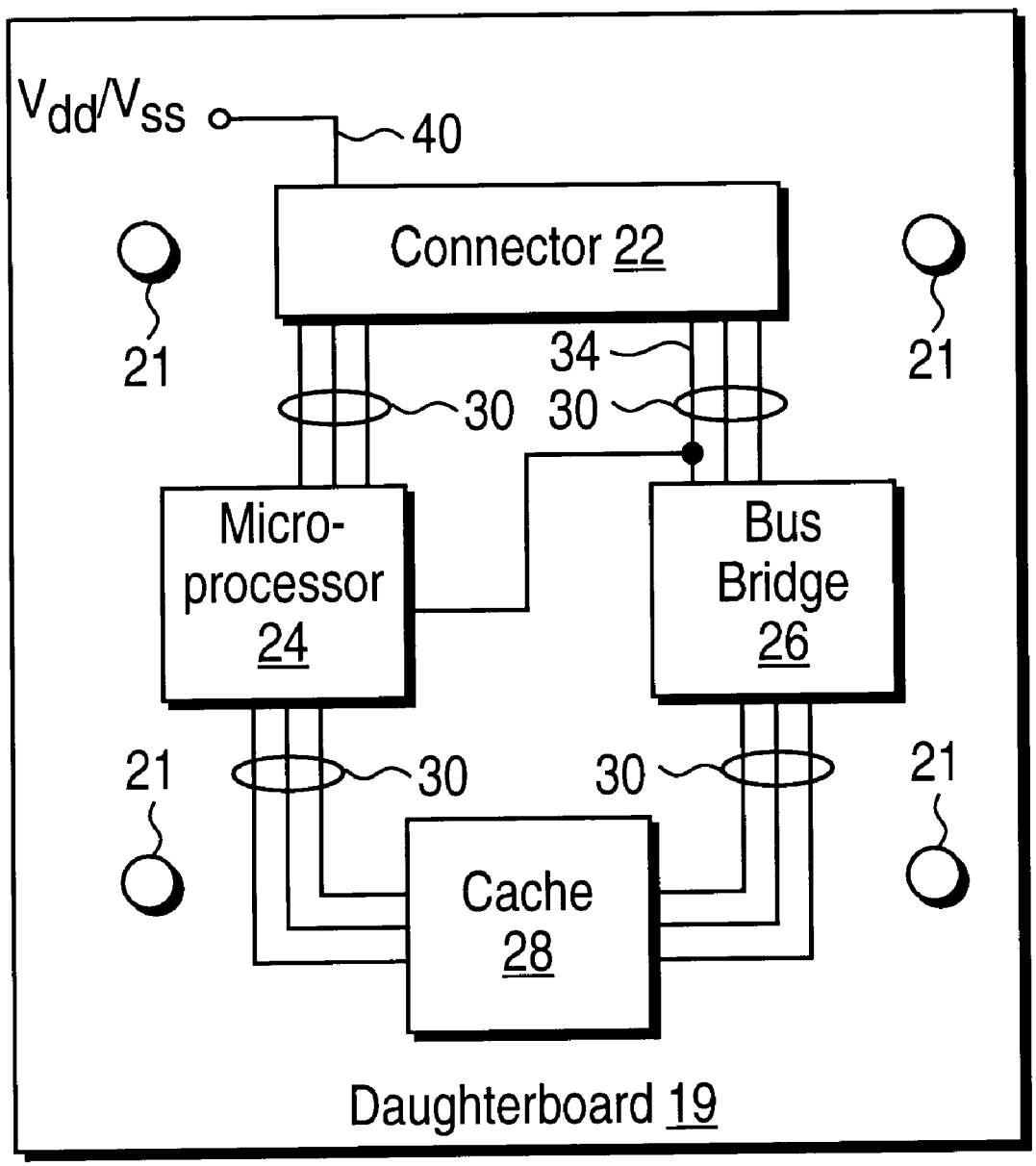
FIG. 2 illustrates a diagrammatic view of one embodiment of the daughterboard arranged to mate with the motherboard of FIG. 1.

Referring now to FIG. 2, a separate, usually smaller, printed circuit board, such as a daughterboard 19, is removably couplable to the motherboard 10 by mechanical fixtures, such as screws (not shown) extending through openings 21 in the motherboard 10 and daughterboard 19. The daughterboard 19 is also electrically couplable to the motherboard 10 by a conventional electrical connector 22 that mates with the electrical connector 17 of the motherboard 10, either directly or through an intermediate cable (not shown).

The daughterboard 19 is similar in construction and function to that of the motherboard 10. That is, the daughterboard 19 is a printed circuit board with semiconductor devices, such as a microprocessor 24, a bus bridge 26, and a cache 28, positioned thereon and interconnected by electrical traces 30. In one embodiment of the instant invention, the microprocessor 24 is a Pentium® microprocessor, and the bus bridge 26 is a Northbridge portion of a PCI chip set manufactured by Intel as part number 430TX. In another embodiment of the instant invention, the microprocessor 24 is a Pentium® II microprocessor, and the bridge is a Northbridge portion of a PCI chip set manufactured by Intel as part number 440BX.

In the first embodiment of the daughterboard 19, both the Pentium® microprocessor 24 and the 430TX bus bridge 26 use a clock signal generated by the clock generator 18 on the motherboard 10. The clock signal generated by the CKDM66 clock generator 18 is communicated over a trace 32 on the motherboard 10, through the electrical connectors 17, 22, over a trace 34 on the daughterboard 19 to the Pentium® microprocessor 24 and the 430TX bus bridge 26. The Pentium® microprocessor 24 and the 430TX bus bridge 26 each require that the clock signal have a maximum voltage of about 3.3V.

In the second embodiment of the daughterboard 19, both the Pentium® II microprocessor 24 and the 440BX bus bridge 26 use a clock signal generated by the CKDM66 clock generator 18 on the motherboard 10. The clock signal generated by the clock generator 18 is communicated over the trace 32 on the motherboard 10, through the electrical connectors 17, 22, over the trace 34 on the daughterboard 19 to the Pentium® II microprocessor 24 and the 430TX bus bridge 26. The Pentium® II microprocessor 24 and the 430TX bus bridge 26 each require that the clock signal have a maximum voltage of about 2.5V. In other words, both embodiments use the same clock generator 18, the same traces 32, 34, and the same electrical connectors 17, 22, but each embodiment requires a different clock signal be delivered over these same connections.

The CKDM66 clock generator 18 has a voltage selection pin 36 that selects the type of clock signal delivered onto the trace 32. That is, if the voltage selection pin 36 is controlled to be a logically high value, then the voltage level of the clock signal delivered by the CKDM66 clock generator 18 is selected to be about 3.3V. On the other hand, if the voltage selection pin 36 is controlled to be a logically low value, then the voltage level of the clock signal delivered by the CKDM66 clock generator 18 is selected to be about 2.5V.

In the first embodiment of the daughterboard 19, a trace 40 on the daughterboard 19 is coupled to a voltage supply $V_{dd}$ to place a logically high signal thereon. The trace 40 is also coupled to the connector 22, and, in turn, to the connector 17 on the motherboard 10. A trace 42 is coupled between the voltage selection pin 36 and the connector 17, such that the logically high signal on the trace 40 is communicated to the CKDM66 clock generator 18. The CKDM66 clock generator 18 responds to the logically high signal by producing the 3.3V clock signal required by the Pentium® microprocessor 24 and the 430TX bus bridge 26.

In the second embodiment of the daughterboard 19, the trace 40 on the daughterboard 19 is coupled to a ground voltage supply $V_{ss}$ to place a logically low signal thereon. The trace 40 is also coupled to the connector 22, and, in turn, to the trace 42 on the motherboard 10. The trace 42 communicates the logically low signal to the voltage selection pin 36, such that the CKDM66 clock generator 18 produces the 2.5V clock signal required by the Pentium® II microprocessor 24 and the 440BX bus bridge 26.

Thus, the present invention provides for an automatic selection of the appropriate clock voltage signal during a manual upgrade operation. This automatic selection is accomplished without the need for intervention by the installer, preventing the wrong voltage level signal from being delivered to the daughterboard 19. In essence, selection of the appropriate clock signal occurs at the time of design of the daughterboard 19. That is, the designer selects the appropriate clock signal by coupling the trace 40 to either $V_{ss}$ or $V_{dd}$, depending upon the type of processor 24 and bus bridge 26. When the daughterboard 19 is mounted on the motherboard 10 with the connectors 17, 22 mated, the bus bridge 18 is programmed to deliver the appropriate clock signal.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus comprising:

a motherboard having a clock generator mounted thereon to deliver a clock signal of either a first maximum voltage or a second maximum voltage onto an output terminal in response to receiving a control signal input to said motherboard; and a daughterboard coupled to said motherboard and having an electrical circuit mounted thereon, the electrical circuit utilizing the clock signal for its operation and in which said daughterboard generates the control signal to select the first or second maximum voltage for the clock signal from the clock generator.

2. The apparatus of claim 1, further including a first connector disposed on said motherboard and a second connector disposed on said daughterboard, said connectors engaged to couple the clock signal and the control signal from one board to the other.

3. The apparatus of claim 2, wherein the control signal has two states and a selected state of the control signal is determined by a clock voltage desired for an operation of the electrical circuit.

4. The apparatus of claim 1, wherein the clock signal has first and second maximum voltages of approximately 2.5 volts and 3.3 volts, respectively.

5. The apparatus of claim 3, wherein said electrical circuit includes a microprocessor.

6. A daughterboard for coupling to a motherboard comprising:
- an electrical circuit mounted thereon, in which said electrical circuit operates using a clock signal of a particular maximum voltage;
- a control signal for identifying the particular maximum voltage required by said electrical circuit;
- a connector mounted thereon for mating to a corresponding connector on the motherboard, said control signal coupled through said connectors to a clock generator on the motherboard to select a maximum voltage for a clock signal generated by the clock generator, said connectors coupling the clock signal to said electrical circuit for its operation.

7. The daughterboard of claim 6, wherein the clock generator on the motherboard generates the clock signal at a first maximum voltage or at a second maximum voltage, in which a state of said control signal determines which maximum voltage is coupled to said electrical circuit.

8. The daughterboard of claim 7, wherein more than one type of electrical circuit is operable on said daughterboard, in which the types are differentiated by the maximum voltage of the clock signal required.

9. The daughterboard of claim 7, wherein said first and second maximum voltages are approximately 2.5 volts and 3.3 volts, respectively.

10. The daughterboard of claim 8, wherein said electrical circuit is a microprocessor.

11. A method of controlling a maximum voltage of a clock signal from a motherboard coupled to a device mounted on a daughter board, comprising:
- mounting the motherboard and the daughterboard together, in which electrical connections are obtained between the motherboard and the daughterboard;
- generating a control signal on the daughterboard corresponding to a clock signal required by the device on the daughterboard;
- coupling the control signal to clock generating circuitry on the motherboard;
- generating an appropriate clock signal in response to the received control signal;
- coupling the generated clock signal to the device on the daughterboard.

12. The method of claim 11 in which the generating an appropriate clock signal generates either a clock signal having a first maximum voltage or a clock signal of a second maximum voltage, depending on a state of the control signal received.

* * * * *